Feb. 26, 1963 F. L. LE BUS, SR., ETAL 3,079,130
CABLE REEVING APPARATUS
Filed July 1, 1960 2 Sheets-Sheet 1

INVENTORS
F. L. LeBus Sr.
BY R. A. Crowley
ATTORNEY C. M. McKnight

Feb. 26, 1963  F. L. LE BUS, SR., ETAL  3,079,130
CABLE REEVING APPARATUS
Filed July 1, 1960  2 Sheets-Sheet 2
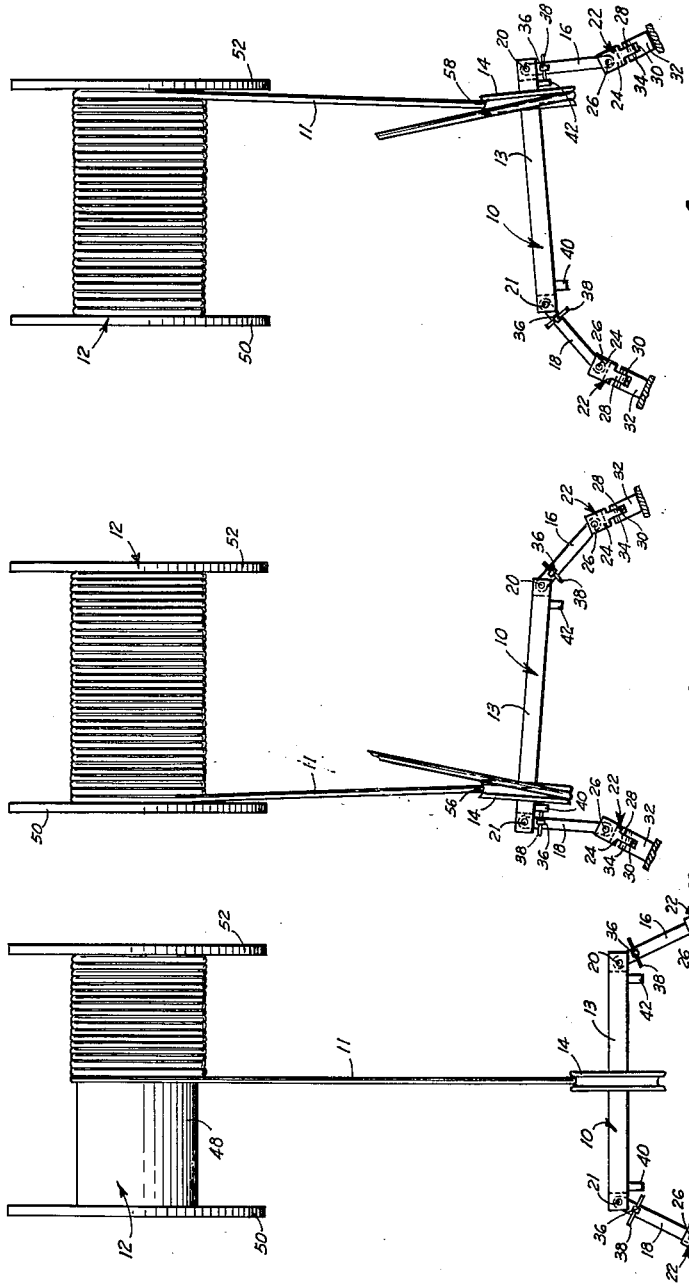
INVENTORS
F. L. LeBus Sr.
R. A. Crowley
BY
ATTORNEY 3,079,130
CABLE REEVING APPARATUS
Franklin L. Le Bus, Sr., and Robert A. Crowley, Longview, Tex., assignors to Le Bus Royalty Company, Longview, Tex., a partnership
Filed July 1, 1960, Ser. No. 40,373
3 Claims. (Cl. 254—190)

This invention relates to improvements in cable spooling apparatus and more particularly, but not by way of limitation, to a cable reeving apparatus particularly designed and constructed for controlling the fleet angle of the cable whereby the cable may be spooled on the drum efficiently and evenly without distortion or entangling of the cable during the winding operation.

Many problems are encountered in the winding or spooling of a wire line or cable onto a drum. The cable having a bad fleet angle from the stationary sheave to the drum core has a tendency to wind unevenly on the core of the drum which results in a jerking and tangling of the cable as it is unspooled from the drum. In addition, it is important that each layer of the cable extend across the drum core from flange to flange with each successive wrap or turn of each layer of the cable being disposed in a close relationship to the adjacent wrap without piling up or laying on top of each other in the proximity of the flange or pile up in the middle or either one side of the drum core between the flanges. It is difficult to control the winding of the cable with the successive turns close together, particularly in well bore drilling operations wherein the load on the cable frequently causes a twisting of the cable. If the initial layer of the cable is inefficiently wound on the drum and the fleet angle is bad, the error will be increased with each successive layer until the control of the cable will be substantially lost.

Many efforts have been made to improve the efficiency of the cable winding operation. Frequently, an operator stands in the vicinity of the drum as the cable having a bad fleet angle is being spooled thereon, and with the assistance of a crow-bar, or the like, attempts to manually guide the cable and overcome a bad fleet angle, which is obviously inefficient and dangerous. As a result, many devices have been developed for guiding the cable, such as the winding devices disclosed in the Robert Paul Bigelow Patent No. 2,922,599, issued January 26, 1960, and entitled "Level Winding Device," and the William D. Allison Patent No. 2,473,628, issued June 21, 1949, and entitled "Winding Device or Winch." The wire line guide devices of the type disclosed by Bigelow depend upon a manual operation, with the resultant probability of human errors which is inherent in a manual control apparatus. Spooling devices of the type disclosed in the Allison patent are so constructed as to provide a considerable amount of friction in the operation thereof, thus materially reducing the efficiency of operation.

The present invention contemplates an extremely simplified apparatus with an automatic simplicity of operation not attainable in devices of this type heretofore available. The friction in the operation of the novel reeving device for eliminating fleet angle of the line as it is reeved onto the drum is reduced to a minimum for optimum efficiency of the cable during the winding thereof onto the drum. A pivotal and transversely movable sheave or pulley cooperates with a stationary sheave for automatically maintaining a substantially perpendicular path for the cable with respect to the axis of the drum during the winding operation, thus if the first layer of cable is properly spooled onto the drum, this invention assures an efficient spooling of the cable for any additional layers of line wraps regardless of excessive fleet angles without any entanglement of the line. The movable pulley responds to the normal action of the cable for automatically adjusting to maintain a constant length for the cable between the stationary sheave and the drum if the first or controlled layer of wraps is properly spooled, thus facilitating the true and accurate multilayer winding of the cable on the drum. With the utilization of the novel reeving apparatus, the fleet angle of the cable may be substantially increased and need not be limited to a low angle, such as is normally required with present day winding devices. For example, many of the winding devices in use today limit the fleet angle to one and one half degrees, whereas the present device permits the fleet angle to be increased to more than ten degrees, and still spool the cable or wire line without any entanglement. Thus, the control of fleet angle in the winding of the cable with the novel reeving apparatus assures that there is a level and accurate and non-distorted winding of any number of layers of the line on the drum at all angles regardless of what the fleet angle may be.

It is an important object of this invention to provide a novel reeving apparatus for controlling the fleet angle during the spooling of a line onto a drum in a true and accurate manner for substantially eliminating any distortion or entanglement of the cable during the spooling operation.

It is another object of this invention to provide a reeving apparatus wherein the control of the fleet angle during the winding of the cable onto the drum is automatic, thereby eliminating human errors inherent in a manual operation.

It is another object of this invention to provide a novel reeving apparatus wherein the friction from a bad fleet angle during the operation thereof is reduced to a minimum for greatly increasing the efficiency thereof.

Another object of this invention is to provide a reeving apparatus particularly designed and constructed to provide an automatic control of the fleet angle during the spooling of the cable whereby the cable will be maintained substantially perpendicular to the axis of the drum throughout the spooling operation.

Still another object of this invention is to provide a reeving apparatus to eliminate fleet angle wherein the length of the cable between the drum and the stationary sheave is constant throughout the winding of the cable onto the drum.

A still further object of this invention is to provide a reeving apparatus for the controlled spooling of cable onto a drum whereby the fleet angle may be substantially increased without interference of the efficiency of the spooling operation.

It is a still further object of this invention to provide a novel fleet angle control wherein the reeving apparatus is simple in both operation and construction with a resultant increased efficiency in the control of the cable spooling operation.

Other objects and advantages of the invention will be evident from the following detailed description, read in conjunction with the accompanying drawings, which illustrate our invention.

In the drawings:

FIGURE 4 is a plan view of the novel reeving apparatus depicting the cable being wound around the drum.

FIGURE 5 is a view similar to FIG. 4 and depicts another position of the cable during the spooling operation.

FIGURE 6 is a view similar to FIG. 4 illustrating still another position of the cable during the winding operation.

Figure 1:
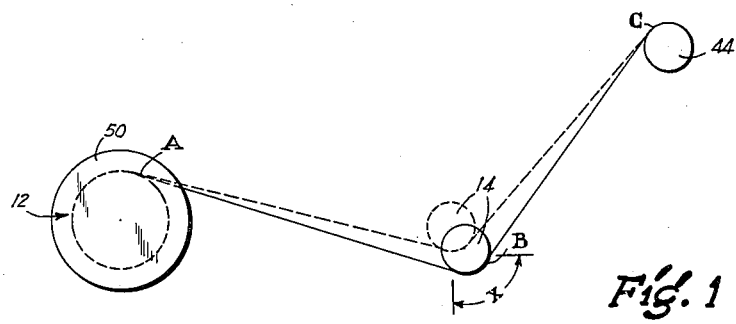
FIGURE 1 is a schematic layout in side elevation of a cable spooling reeving apparatus embodying the invention.

Referring to the drawings in detail, reference character 10 refers in general to a fleet angle corrector or reeving apparatus of a substantially trapezoidal configuration for guiding the spooling of a cable 11 onto a drum 12. The reeving apparatus 10 comprises a circular rod or shaft 13 having a transversely movable sheave or pulley 14 journalled thereon in any suitable manner (not shown). The opposed ends of the shaft 13 are bifurcated or provided with a slot (not shown) for receiving one end of substantially identical pivot arms 16 and 18 therein, as clearly shown in FIGS. 4, 5 and 6. One end of each of the arms 16 and 18 is pivotally secured to the respective opposed ends of the shaft 13 in any well known manner, such as pivot pin members 20 and 21, respectively, extending through the shaft and the arms. The opposite ends of the arms 16 and 18 are each provided with a suitable universal joint 22 of the clevis type, which in turn are each fixed to any suitable mounting frame, or the like (not shown), in juxtaposition to the drum 12.

Each universal joint 22 comprises a link member 24 having one end thereof bifurcated for receiving a pivot arm 16 or 18 therein, which is pivotally secured thereto by a suitable pivot pin 26. The opposite end of the link 24 is provided with a tongue member 28 for insertion within the slotted or bifurcated portion 30 of a complementary link member 32. The tongue is pivotally secured to the link member 32 by a suitable pivot pin 34 which is disposed in a perpendicular relationship with the pin 26. It will be apparent that the pivot pins 26 and 34 cooperate with the link members 24 and 32 for providing a universal action for the joint 22, for a purpose as will be hereinafter set forth.

Each of the pivot arms 18 and 16 is provided with a bearing member 36 having a shaft 38 threadedly secured therethrough for cooperation with a pair of oppositely disposed stop members 40 and 42, respectively, provided on the shaft 13 adjacent the slotted end portions thereof. The stops 40 and 42 cooperate with the pins 38 for limiting the extreme movement of the shaft 13 in one direction or the opposite direction as clearly depicted in FIGS. 5 and 6.

A fixed sheave or pulley 44 (FIGS. 1, 2 and 3) is journalled on any suitable support member 46 for receiving the cable 11 thereover during the spooling or unspooling operation, as is well known. The drum 12 may be of any type, such as a winch used with an oil derrick, a hoisting mechanism, or the like, and normally comprises a core 48 (FIG. 2) having opposed end flanges 50 and 52 secured thereto. During the spooling of the cable 11 onto the drum 12, it is preferable that the cable be wound around the core with each wrap of the cable laying in close proximity to the adjacent wrap. In addition, it is important that each layer of the cable 11 on the drum 12 extend completely across the core 48 between the flanges 50 and 52, with no piling up of the cable at the flanges.

The cable extends from the drum 12, under the movable sheave 14 and over the stationary pulley 44 to the load (not shown) being manipulated thereby. As the cable 11 progresses in a transverse direction across the drum core 48 during the spooling or unspooling operation, as will be hereinafter set forth, the reeving apparatus 10 automatically shifts for moving the pulley 14 transversely in accordance with the pull or force of the cable 11. The pressure of the cable 11 and the correction of movable sheave 14 on the shaft 13 automatically changes the angular disposition of the shaft through the action of the pivot arms 16 and 18. This is caused by the generally trapezoidal configuration of the reeving apparatus 10. It is well known that any force along a trapezoid will have one resultant force, or a neutralization point. The line 11 pulls the sheave 14, and the sheave 14 does not pull the line. Furthermore, it will be apparent that any suitable type of friction guide member (not shown) may be utilized in lieu of the sheave 14.

*Operation*

Figure 2:
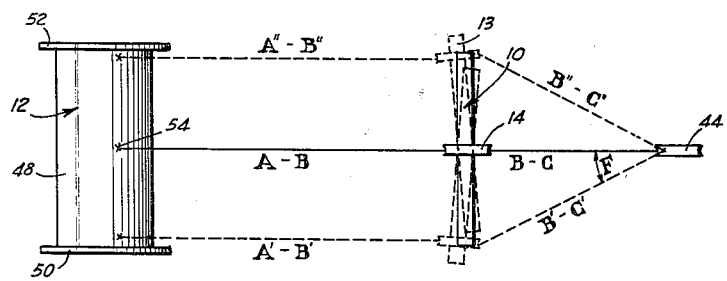
FIGURE 2 is a schematic plan view of a reeving apparatus as depicted in FIG. 1.
Figure 3:
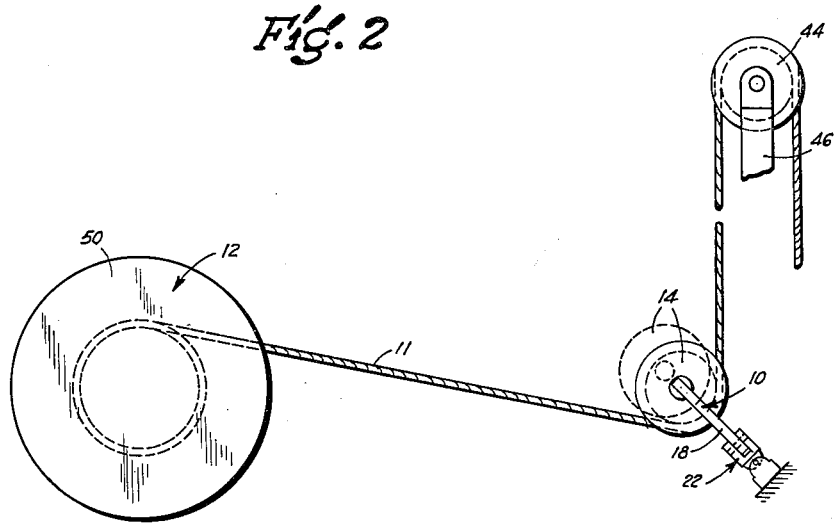
FIGURE 3 is a view similar to FIG. 1, but enlarged for purposes of a more detailed illustration.

In order to effect the compensation of the fleet angle or correction of the cable 11 for assuring an efficient spooling or unspooling operation, the reeving apparatus 10 is interposed between the drum 12 and the stationary sheave 44 whereby the movable sheave 14 receives the cable thereunder, as particularly depicted in FIG. 3. Any movement of the cable to the left or right of the mean or center point 54 (FIG. 2) of the drum core 48 will cause the correction pulley 14 to move to either the left or right of the center point in accordance with the direction of the spooling, or unspooling of the line or cable. The pressure of the cable 11 and the sheave 14 on the shaft 13 changes the angular disposition of the shaft, as shown in dotted lines in FIG. 2, whereby the sheave 14 will always be so positioned with respect to the pull point of the cable 11 coming off the drum 12 to maintain the cable portion A—B substantially perpendicular to the longitudinal axis of the drum. This is caused by the pivotal action of the arms 16 and 18 and the universal joints 22 whereby the linkage members 16 and 18 are always in a state of equilibrium. In other words, the summation of moments about the pins 26 or links 16 and 18 is equal to zero. When the cable on the drum moves therealong, the pressure or force exerted on the sheave 14 and shaft 13 brings the linkage constantly into another state of equilibrium. For example, as shown in FIG. 5, the pull on cable 11 exerts a greater force on link 18 than on link 16, but the moment arm related with link 18 to the line of pull is very short. Simultaneously, the pull on link 16 is less, but the moment arm is much longer. Thus, the summation of moments about the pins 26 is always equal to zero.

The friction contact of the cable being wound on the drum exerts a pressure through the cable which is transmitted to one side of the sheave 14, thus causing the sheave 14 to move in the direction in which the pressure is exerted. Since the sheave 14 is transversely movable on the shaft 13, the sheave will follow the pressure, and move along the shaft 13 in accordance with the winding of the cable on the drum, or unwinding thereof, as desired. Therefore, if the cable 11 is moving from a right to a left position, as shown in FIG. 5, the winding of the drum 12 is toward the left flange 50, and the sheave 14 will move to the left due to the pressure of the cable acting against the portion 56 of the sheave, and through a circumferential distance indicated as X in FIG. 1.

The length of the cable 11 between the tangent point C (FIG. 1) of the stationary sheave 44 and the tangent point A of the drum core 48 remains constant, and the movable sheave 14, which divides the length A—C of the cable into two sections, namely A—B and B—C, maintains the constant length for the cable A—C. Referring particularly to FIG. 2, as the movable sheave 14 moves in a left hand direction, or toward the flange 50, the fleet angle F between the fixed sheave 44 and the movable sheave 14 will increase, whereby the length of the cable portion B—C will increase, as shown in dotted lines as B'—C'. The cable portion A—B will simultaneously shorten, as shown in dotted lines as A'—B'. However, the combined lengths of the cable portions A'—B' and B'—C' will always remain the same as the overall length of the cable portion A—C. This is caused by the swiveling or shifting of the axis of the shaft 13. The same pressure that causes the movement of the sheave 14 is sufficient to cause a pivoting of the shaft, as shown in dotted lines in FIG. 2, so that the pivot pin 21 moves in a direction toward the drum as the sheave 14 nears or moves toward the pin 21 and flange 50. Conversely, the pivot pin 20 on the opposite end of the shaft will move in a direction away from the drum.

Similarly, as the movable sheave 14 moves in a right hand direction, or toward the flange 52, the cable portion B"—C" increases in length while the cable portion A"—B" shortens. In this operation, the pivot pin 20 of the shaft 13 will be moved in a direction toward the drum 12 by the line pressure exerted on the point 58 (FIG. 6) of the sheave 14, and the pivot pin 21 will be moved in a direction away from the drum. This swiveling or pivotal shifting action of the shaft 13 functions to maintain the overall length of the cable portion A—C constant during transverse movement of the cable during the spooling thereof on the drum, which is important in maintaining an efficient control of the spooling of the cable on the drum, or unspooling thereof.

FIGURE 6 depicts the opposite winding from that shown in FIG. 5 in that there is a wrapping of the cable onto the drum from left to right instead of from right to left. It will be apparent that small increments of movement of the sheave 14 will cause small increments of angular movement of the shaft 13, and these small increments of movement are caused by the progressive winding of the cable around the drum core.

As the cable 11 nears or approaches the right hand flange 52, the angular shifting of the shaft 13, as hereinbefore set forth, brings the stop member 42 into contact with the pin 38 carried by the pivot arm 16, as shown in FIG. 6. This limits the movement of the shaft 13 in the right hand direction whereby the cable does not quite reach a full ninety degree angle with respect to the drum axis, as clearly shown in FIG. 6. This creates a slight fleet angle in the cable at the vicinity of the drum flange and the cable will then automatically rise to the next layer and proceed back across the drum, to provide for the next succeeding layer of winding or wrapping on the drum. If the cable is permitted to reach the full ninety degree position with respect to the drum axis at the end of a layer, the line or cable has a tendency to pile up at the flanges, which is a disadvantage as hereinbefore set forth. The cable then continues to wind onto the drum in a direction from right to left, and as the cable nears the flange 50, the shifting of the shaft 13 brings the stop member 40 into contact with the pin 38 carried by the pivot arm 18. This limits the left hand movement of the shaft 13, and initiates the reverse movement of the cable 11 to provide for the next succeeding layer thereof on the drum.

By way of summary, the fleet angle correction apparatus 10 automatically corrects the fleet angle of the cable coming from the stationary sheave 44 and maintains the cable in a substantially perpendicular relationship with regard to the axis of the drum 12 during the spooling or unspooling operation. The pressure of the cable passing under the movable sheave 14 automatically causes an adjustment or shifting of the shaft 13 simultaneously with a transverse movement of the sheave 14 therealong for maintaining the sheave 14 in a constant parallel alignment with the pull point of the cable on the drum. The universal movement of the pivot arms 16 and 18 cooperate with the shaft 13 and the sheave 14 for maintaining the length of the cable between the drum and the stationary sheave constant throughout the spooling operation and providing for vertical fluctuations of the shaft 13 during the spooling and unspooling operations. The piling up of the cable at the flanges upon the reversing of the winding at the end and beginning of each layer is eliminated by the limitation of the left and right hand movement of the shaft. Thus, the winding of the cable onto the drum, or unwinding thereof, is controlled automatically to provide a true and accurate winding, layer after layer.

From the foregoing, it will be apparent that the present invention provides a novel reeving apparatus for the correction or compensation of the fleet angle in the spooling or unspooling of a line from a winch or drum for effecting an efficient winding of the line onto the drum without any distortion or entanglement thereof. The novel reeving apparatus is automatically shifted by the pressure of the cable or line being spooled for maintaining the line substantially perpendicular to the axis of the drum throughout the spooling operation. This cambering movement of the shaft effects the position of the movable sheave thereon for correcting the fleet angle accordingly. The limitation of the left and right movement of the shaft initiates the reversal of the cable at the end and beginning of each layer for substantially eliminating any piling up of the cable adjacent the drum flanges. The novel compensating or reeving apparatus is extremely simple in construction and operation, and functions in a completely automatic manner for controlling the spooling operation.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. In combination with a drum having a cable wound thereon, a reeving apparatus comprising a fixed sheave spaced from the drum for receiving the cable therefrom, a movable sheave interposed between the drum and the fixed sheave to constantly correct the angle between the cable and the fixed sheave, a shaft spaced from the drum for supporting the movable sheave, said movable sheave responsive to pressure of the cable during the winding and unwinding operations for movement along the shaft, universal joint means secured to the opposed ends of the shaft and cooperating therewith to provide an automatic shifting and swiveling of the shaft in response to the pressure of the cable on the movable sheave for maintaining the cable between the movable sheave and the drum substantially perpendicular to the drum axis, and stop means cooperating between the universal joint means and the shaft for limiting the shifting of the shaft to effect a reversing of the winding of the cable on the drum.

2. In a cable spooling apparatus, a shaft, a sheave journalled on the shaft and movable therealong and about which a cable extends, a fixed sheave spaced from the movable sheave for receiving the cable, said movable sheave responsive to movement of the cable for movement along the shaft, means providing for automatic lateral shifting and vertical fluctuation of the shaft upon movement of the sheave therealong for constantly correcting the fleet angle of the cable and providing movement of the cable relative to one side of the movable sheave in a direction substantially parallel to the plane of the movable sheave, said means comprising pivot arms secured to the opposed ends of the shaft, and universal joint means secured to the pivot arms to provide for the lateral shifting and vertical fluctuation of the shaft to maintain a control of the cable throughout the spooling operation.

3. In combination a drum having a cable wound thereon, a reeving apparatus comprising a shaft mounted in juxtaposition to the drum, a sheave journalled on the shaft and movable therealong in response to pressure from the cable during the cable winding and unwinding operations, universal joint means cooperating with the shaft for lateral shifting of the shaft in response to pressure of the cable on the sheave during the winding and unwinding operations for maintaining the cable in a path substantially perpendicular with the axis of the drum, stop means cooperating with the universal joint means for limiting the lateral shifting of the shaft prior to the movement of the cable to the perpendicular position with respect to the drum axis at the end of each layer for effecting a reversal of the winding of the cable on the drum, and means providing for vertical fluctuations of the shaft during the winding and unwinding operations.

References Cited in the file of this patent
UNITED STATES PATENTS

| | | |
|---|---|---|
| 2,228,346 | Downie | Jan. 14, 1941 |
| 2,249,117 | Crandall | July 15, 1941 |
| 2,372,232 | Thornburg | Mar. 27, 1945 |
| 2,855,163 | Powers | Oct. 7, 1958 |